(12) United States Patent  
Gang

(10) Patent No.: US 7,097,406 B1
(45) Date of Patent: Aug. 29, 2006

(54) WHEEL SKATE

(76) Inventor: Wang Gang, 212 Jiang Ning Road, Shanghai 200041 (CN)

( * ) Notice: Subject to any disclaimer, the term of this patent is extended or adjusted under 35 U.S.C. 154(b) by 271 days.

(21) Appl. No.: 10/715,345

(22) Filed: Nov. 17, 2003

Related U.S. Application Data

(60) Provisional application No. 60/426,923, filed on Nov. 16, 2002.

(51) Int. Cl.
B60B 29/00 (2006.01)

(52) U.S. Cl. ............ 414/429; 254/105; 280/79.4
(58) Field of Classification Search .......... 254/14, 254/105, 108, 237, 244; 280/79.4; 414/426, 414/429
See application file for complete search history.

(56) References Cited

U.S. PATENT DOCUMENTS

| | | | |
|---|---|---|---|
| 1,275,716 A | | 8/1918 | Maurer, Jr. |
| 1,361,889 A | | 12/1920 | Miller et al. |
| 2,217,898 A | | 10/1940 | Gemmill |
| 2,362,981 A | | 11/1944 | Baum |
| 2,380,415 A | | 7/1945 | Carruthers |
| 2,392,409 A | * | 1/1946 | Ray ............ 414/429 |
| 2,970,810 A | * | 2/1961 | Zich et al. ............ 254/420 |
| 3,145,859 A | | 8/1964 | Barosko |
| 3,474,997 A | * | 10/1969 | Hinrichsen ............ 254/105 |
| 3,749,361 A | * | 7/1973 | Johnson ............ 254/2 R |
| 3,788,604 A | * | 1/1974 | Cameron ............ 254/108 |
| 3,848,851 A | * | 11/1974 | Elias ............ 254/108 |
| 4,050,597 A | | 9/1977 | Hawkins |
| 4,449,704 A | * | 5/1984 | Goulter ............ 269/88 |
| 4,460,306 A | | 7/1984 | Hawkins |
| 4,690,605 A | | 9/1987 | Coccaro |
| 4,854,803 A | | 8/1989 | Coccaro |
| 5,112,070 A | | 5/1992 | Hahn |
| 5,732,960 A | | 3/1998 | Elam |
| 6,106,214 A | | 8/2000 | Saffelle et al. |
| 6,789,994 B1 | * | 9/2004 | Tortellier ............ 414/429 |
| 2001/0038094 A1 | * | 11/2001 | Lundy et al. ............ 254/1 |
| 2004/0146384 A1 | * | 7/2004 | Whelan ............ 414/426 |

* cited by examiner

Primary Examiner—James W. Keenan

(57) ABSTRACT

A skate for a wheel assembly of a motor vehicle is used to maneuver the vehicle in confined spaces. The wheel skate has a U-shaped frame fitted to the wheel assembly by adjusting the width of the expandable/contractible frame until the unit is wide enough to position a plurality of rollers in engagement with opposing sides of the tire of the wheel assembly. A foot pedal lever is operated to contract the frame assembly and raise the tire clear of the garage floor. A locking knob drops into a hole in the frame assembly to lock the position of the frame assembly. A fork drives the frame assembly together. The locking knob does not move into the following hole until the fork is moved into another hole. The device is used in pairs which are attached to either the front or back wheels in order to swing one end of the vehicle around.

17 Claims, 3 Drawing Sheets

WHEEL SKATE

CROSS REFERENCE TO RELATED APPLICATION

This application claims the benefit of U.S. Provisional Patent Application Ser. No. 60/426,923 filed Nov. 16, 2002.

FIELD OF THE INVENTION

The invention relates to apparatus used for maneuvering motor vehicles in confined spaces, particularly wheeled dollies having lifting frame assemblies attachable to the tire of a vehicle.

BACKGROUND OF THE INVENTION

The use of wheeled dollies and trucks having lifting assemblies and structures for maneuvering or positioning vehicles in interior spaces of garages, warehouses and the like is known.

Elam in U.S. Pat. No. 5,732,960 discloses a dolly for lifting and transporting an automobile. The dolly has a generally U-shaped frame with a pair of arms attached to a base member at right angles. The arm assemblies engage the wheel assembly of the automobile to lift and transport the automobile. Casters secured to the arms allow movement of the dolly over a ground surface.

Barosko in U.S. Pat. No. 3,145,859 discloses a truck for picking up and transporting heavy wheel and tire assemblies having generally horizontal load bearing arms. A hydraulic jack is actuated to raise the arms.

Carruthers in U.S. Pat. No. 2,380,415 discloses a wheel and tire lift having a pair of plates joined with telescoping tubes. A screw shaft extending through the tubes is rotated to pull the tubes together. Each plate carries an arcuate-shaped rockable cradle having rollers that can be set under the wheel.

Baum in U.S. Pat. No. 2,362,981 discloses an airplane lift dolly having a frame having shoes that fit under the sides of the tire. Shoe is adapted to move inwardly and upwardly in a scooping motion to lift the wheel. Shoe has a plurality of rollers to avoid sliding friction between the shoe and tire as the tire is scooped up.

Safety is a concern when using trucks and dollies to lift, support and transport vehicles which are relatively heavy objects having weights producing a large amount of inertia. It is essential to have dependable, safe and automatic lifting and locking structure to avoid damage to the motor vehicle or personal injury.

SUMMARY OF THE INVENTION

The wheel skate of the invention has an adjustable frame assembly which is adapted to be fitted to the wheel assembly of a motor vehicle. The frame assembly is connected to a foot pedal lever operable to contract telescopically connected first and second frame members of the frame assembly and position a pair of arms having a plurality of rollers in engagement with opposite sides of the tire to raise the wheel assembly off the ground surface. A plurality of caster wheel assemblies supporting the frame assembly on the ground surface provide the desired mobility of the wheel skate. A locking member extends through holes in the frame members to lock the position of the frame assembly. When the lever is operated to contract the frame assembly the locking member is forced upwardly to allow the contraction. Upon completion of the contraction movement, the locking member is moved downwardly through a following hole in the second frame member to relock the position of the frame members of the frame assembly thereby preventing inadvertent separation of the frame members.

DESCRIPTION OF THE DRAWINGS

Referring to FIG. 1, there is shown a wheel skate of the invention indicated generally at 10 used for maneuvering a motor vehicle in confined areas, such as body shops, auto mechanics' garages and car show rooms. Wheel skate 10 has a generally U-shaped frame 11 which is adapted to be positioned adjacent the wheel assembly of a vehicle. Wheel skate 10 is fitted to the wheel by adjusting the width of frame assembly 11 to position a pair of roller assemblies 17 and 18 adjacent opposite sides of the the tire of the wheel assembly. A lever 15 is operable to contract frame assembly 11 thereby moving roller assemblies 17 and 18 together thereby raising the bottom of the tire clear of the garage floor. A handle 20 attached to frame assembly 11 facilitates manual transport of wheel skate 10. Wheel skate 10 can be used in pairs attached to either the front or back wheels of the vehicle in order to allow one end of the vehicle to swing around.

Figure 1:
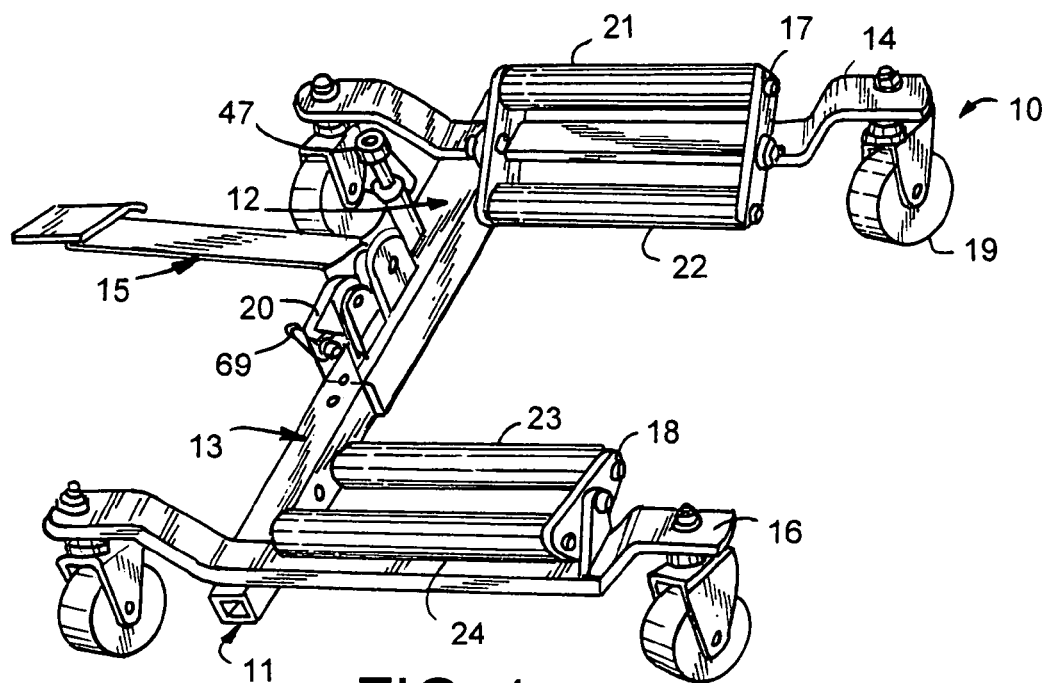
FIG. 1 is a perspective view of the wheel skate of the invention.

Frame assembly 11 is an expandable/contractible U-shaped member having telescoping generally linear frame members 12 and 13 having outer ends attached to outwardly directed arms 14 and 16. Caster wheel assemblies 19 mounted in swivel frames 25 on the outer ends of each arm 14 and 16 support frame assembly 11 on the ground. Frame member 12 is a tubular rectangular shaped driving member adapted to fit frame member 13 which is a tubular rectangular shaped sliding member that slides within frame member 12 to allow contraction and expansion of frame assembly as desired. Frame member 12 and 13 can have other telescopic shapes that slide or pass one within another, such as cylindrical shaped members and the like. A U-shaped handle 20 attached to frame member 12 can be gripped to lift and carry wheel skate 10 to selected locations or storage areas.

Figure 4:
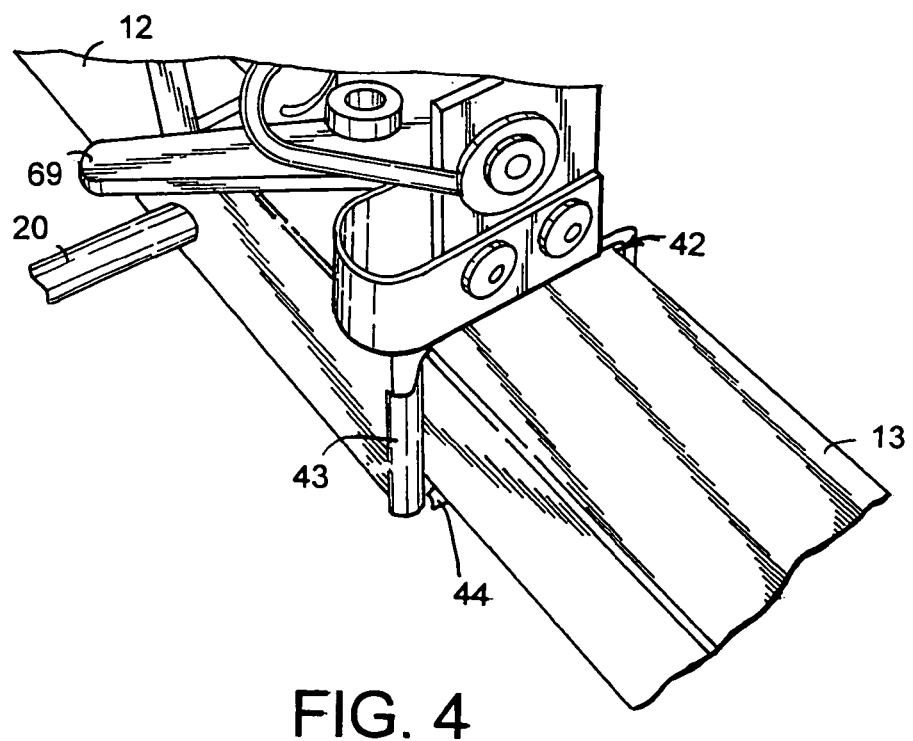
FIG. 4 is an enlarged perspective view of the telescopic connection between the first frame member and second frame member of the frame assembly of the wheel skate of FIG. 1.

As shown in FIG. 4, a plurality of spring plates 42, 43 and 44 located between the sliding surfaces of frame members 12 and 13 reduce the friction between frame members 12 and 13 thereby facilitating movement of frame member 13 inside of frame member 12. Other methods, structures and materials, such as grease, that reduce friction between sliding surfaces can be used to reduce friction between frame members 12 and 13.

Each arm 14 and 16 carries a load-bearing roller assembly 17 and 18. Roller assemblies 17 and 18 each have a plurality of rollers 21, 22, 23 and 24. Rollers 21 to 24 facilitate positioning and lifting of the vehicle wheel assembly during operation of wheel skate 10. Rollers 21 to 24 are rotatably mounted on roller assemblies 17 and 18 whereby rollers 21 to 24 rotate when the wheel assembly is lifted reducing friction between the outer surface of the tire and the rollers.

Figure 5:
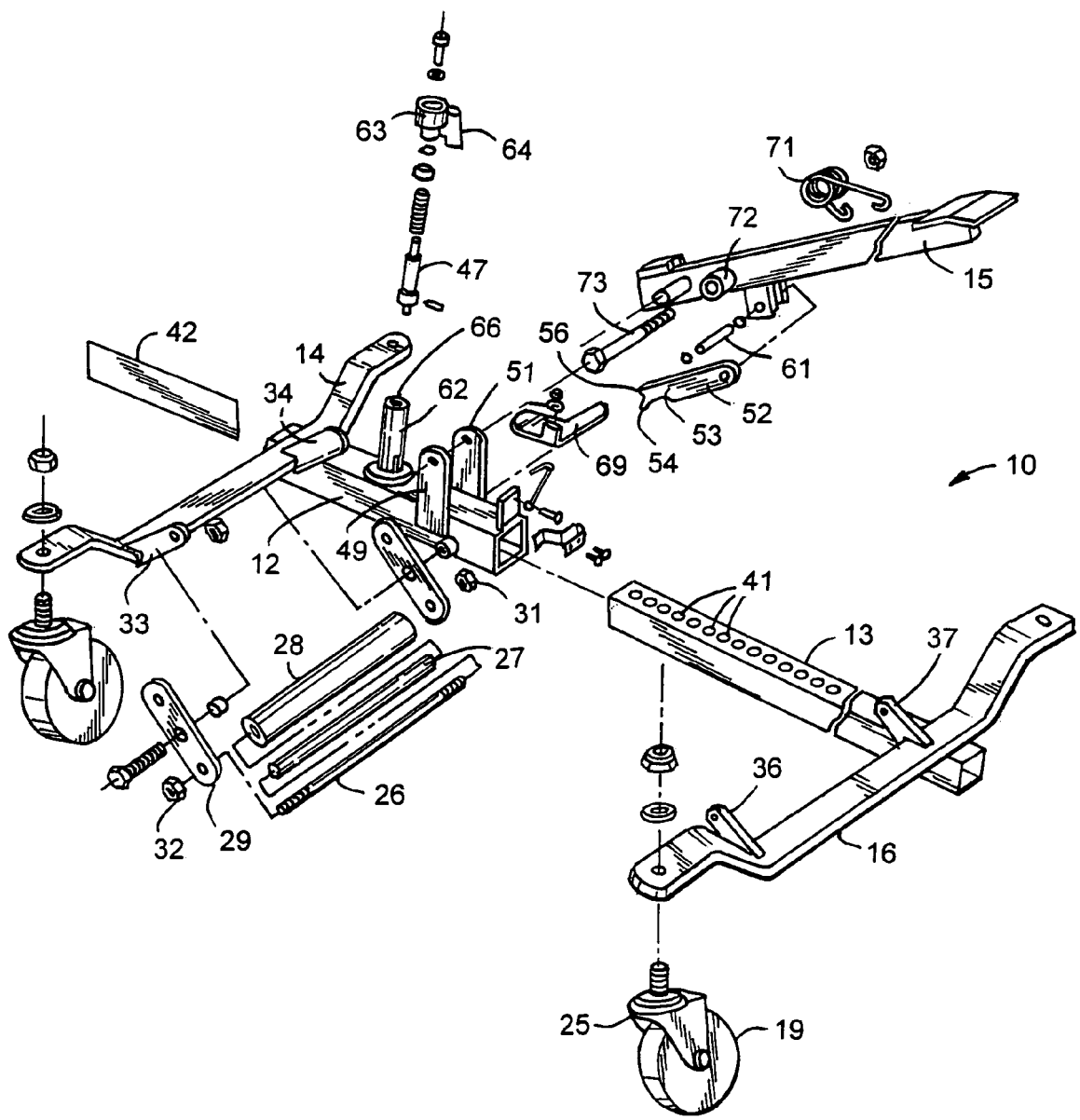
FIG. 5 is an exploded perspective view of the wheel skate shown in FIG. 1.

Referring to FIG. 5, each roller 21 to 24 comprises a clamping rod 26 extending through a tubular sleeve 27. Sleeve 27 carries a tubular roller member 28. The ends of rod 26 are secured to a pair of connection plates 29 with lock nuts 31 and 32. Roller assembly 17 is mounted on inwardly and upwardly inclined brackets 33 and 34 whereby roller 22 of roller assembly 17 is located inwardly and downwardly from arm 14. Roller 21 is positioned upwardly and in general vertical alignment with arm 14.

Roller assembly 18 has substantially the same structure as roller assembly 17. Roller assembly 18 is mounted on inwardly and upwardly inclined brackets 36 and 37 joined to the top of arm 16 whereby roller 23 is located inwardly and downwardly from arm 16. Roller 24 is positioned upwardly and generally vertically aligned with arm 16.

Roller assemblies 17 and 18 are pivotally mounted to brackets 33 and 34, and 36 and 37, respectively, whereby roller assemblies 17 and 18 are self adapting to the shape of the tire. Roller assemblies 17 and 18 pivot or rotate in opposite directions relative to each other to accommodate tires having larger or smaller sized diameters and to center rollers 21 and 22 and rollers 23 and 24 on either side of the tire.

Figure 2:
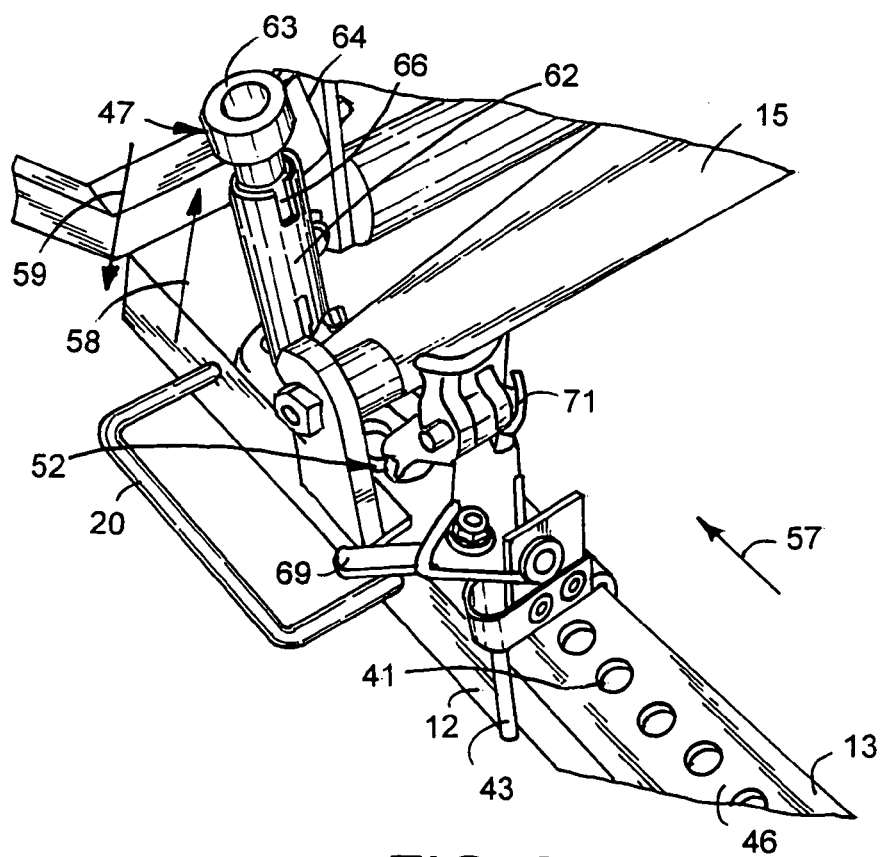
FIG. 2 is an enlarged perspective view of the lever mechanism and locking assembly of the wheel skate shown in FIG. 1.
Figure 3:
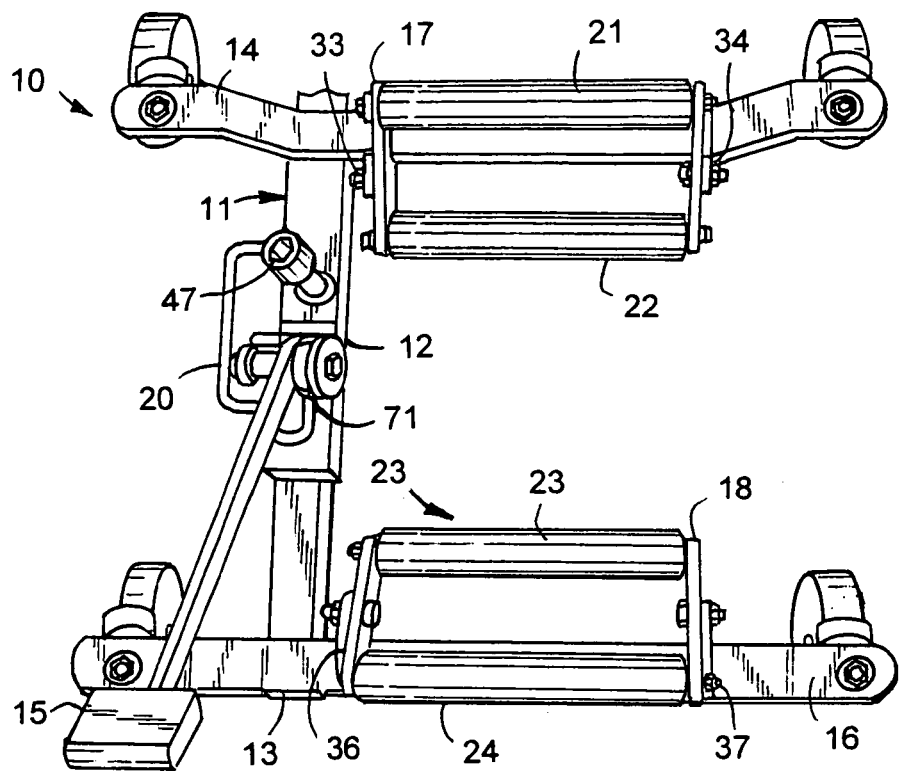
FIG. 3 is a top plan view of the wheel skate of FIG. 1.

Referring to FIG. 2, the top wall of frame member 13 has a plurality of longitudinally spaced holes or openings 41. Openings 41 are generally circular shaped and are longitudinally separated at equal distances by flanges 46 located between each opening 41. A locking knob or pin 47 accommodated by an upwardly projecting sleeve 62 surrounding an opening in the top wall of frame member 12 is moveable into one of the openings 41 in frame member 13 to lock the position of frame member 12 and 13 relative to one another and prevent inadvertent separation of the frame members 12 and 13. Pin 47 has a head 63 having a transverse tab 64 accommodated by a slot 66 open to the top of sleeve 62. Pin 47 is rotatable in sleeve 62 to position tab 64 in slot 66 whereby pin 47 engages frame member 13 in the locking position. A pivotally mounted blocking member 69 connected to frame member 12 adjacent ears 49 and 51 is moveable between first and second positions to engage and disengage lever 15. As frame member 13 is moved into frame member 12 flange 46 is moved into engagement with pin 47 thereby forcing pin 47 in an upward direction, as indicated by arrow 58 in FIG. 2, and allowing further inward movement of frame member 13. Frame member 13 is moved inwardly until pin 47 is aligned with an adjacent immediately succeeding or following hole 41 whereupon pin 47 drops or moves downwardly into the following hole to relock the position of frame members 12 and 13.

A foot operated pedal or lever 15 is moveably mounted on upwardly directed ears 49 and 51 joined to the sides of frame member 12. Lever 15 is an elongated linear member having a transverse sleeve 72 accommodating pivot pin 73 connecting lever 15 to ears 49 and 51. A spring 71 surrounding transverse sleeve 72 biases lever 15 in an inclined upwardly and outwardly position about 45 degrees relative to frame member 12. A support plate 52 having a fork-shaped lower end 53 is pivotally connected to the lower portion of lever 15 with a pivot pin 61. Lower end 53 of plate 52 has fingers 54 and 56 adapted to extend into holes 41 in the top wall of frame member 13, engage flanges 46 and move frame member 13 upon operation of lever 15.

In use, blocking member 69 is moved to the first position, as seen in FIG. 2, to engage lever 15. Pin 47 is rotated in upright sleeve 62 to move tab 64 out of slot 66, as seen in FIG. 2. When lever 15 is moved from an upwardly inclined or first position to a downwardly generally horizontal or second position adjacent frame members 12 and 13, the lower end 53 of plate 52 drives frame member 13 toward frame member 12, as shown by arrow 57 in FIG. 2. As frame member 13 is driven inwardly with plate 52 the lower end of pin 47 moves out of the locking position in hole 41, as shown by arrow 58 in FIG. 2, upon engagement with flange 46 between holes 41. Pin 47 drops downwardly and extends through the adjacent hole 41, as shown by arrow 59 in FIG. 2, when frame member 13 has been moved to move pin 47 out of engagement with flange 46 and into alignment with the next hole. Pin 47 does not drop into the next hole until lever 15 has been moved to the second position adjacent frame members 12 and 13 whereby plate 52 has completed its driving action and is in a position to be moved to an adjacent hole immediately inward from the hole which lower end 53 of plate 52 had previously occupied. Spring 71 moves lever 15 upwardly to the first position to commence a succeeding stroke. This action causes frame member 13 to be gradually moved toward frame member 12 so that the wheel assembly can be raised. To lower the wheel assembly, blocking member 69 is moved to the second position to disengage lever 15 and allow frame member 13 to gradually separate from frame member 12. Throughout the raising and lowering operation of the wheel assembly a continuous locking relation exists between frame members 12 and 13 to prevent inadvertent separation of frame members 12 and 13 thereby preventing property damage or personal injury and minimizing safety concerns.

The present disclosure is a preferred embodiment of the wheel skate. It is understood that the wheel skate is not to be limited to the specific materials, constructions and arrangements shown and described. It is understood that changes in parts, materials, arrangement and locations of structures may be made without departing from the invention.

The invention claimed is:

1. An apparatus for maneuvering a vehicle having a wheel assembly, the apparatus comprising: an adjustable frame assembly adapted to be fitted to the wheel assembly, the frame assembly having first and second frame members telescopically connected to each other, the second frame member having a plurality of longitudinally spaced holes, a lever connected to the first frame member, the lever having a lower end pivotally connected to a plate member, the plate member having at least one finger extending into one of the holes in the second frame member and engaging the second frame member upon operation of the lever to move the second frame member toward the first frame member, the first and second frame members each having an arm, each arm having a plurality of rollers moveable into engagement with the wheel assembly when the first and second frame members are contracted, a locking member having an upright pin extending through aligned holes in the first and second frame members operable to lock the position of the frame assembly, the pin engaging a flange between the longitudinally spaced holes in the second frame member whereby the pin is moved in an upward direction when the second frame member is moved toward the first frame member, the pin moveable in a downward direction through a following hole in the second frame member to relock the position of the first and second frame members upon completion of the contraction movement when the following hole is moved into alignment with the pin.

2. The apparatus of claim 1 including: a plurality of caster wheel assemblies connected to the frame assembly for supporting the frame assembly on a surface.

3. The apparatus of claim 1 wherein: the lever is a foot pedal lever.

4. The apparatus of claim 1 wherein: the frame assembly is a generally U-shaped frame adapted to be positioned adjacent opposite sides of the wheel assembly.

5. The apparatus of claim 1 wherein: the first and second frame members are generally linear frame members having outer ends attached to outwardly directed arms.

6. The apparatus of claim 1 wherein: the first frame member is a tubular rectangular shaped driving member, the second frame member being a tubular rectangular sliding member telescopically received by the first member to allow contraction and expansion of the frame assembly as desired.

7. The apparatus of claim 1 including: means located between the telescoping surfaces of the first and second frame members to reduce friction between the first and second frame members.

8. The apparatus of claim 7 wherein: the means located between the telescoping surfaces of the first and second frame members to reduce friction between the first and second frame members is one or more spring members.

9. The apparatus of claim 1 wherein: each arm has a roller assembly, the roller assembly having a pair of rollers rotatably mounted on the roller assembly whereby the rollers rotate relative to the outer surface of the wheel assembly when the first and second frame members are contracted to raise the wheel assembly.

10. The apparatus of claim 9 wherein: the roller assembly is mounted on an inwardly and upwardly inclined bracket whereby one of the rollers is located inwardly and downwardly from the arm and the other roller is positioned upwardly and in general vertical alignment with the arm.

11. The apparatus of claim 9 wherein: the roller assembly is pivotally mounted to an inwardly and upwardly inclined bracket.

12. The apparatus of claim 1 wherein: the pin is accommodated by an upwardly projecting sleeve surrounding the hole in the first frame member, the pin having a tab member, the top of the sleeve having a downwardly extending slot open to the top of the sleeve, the tab member accommodated by the slot when the pin is in the lock position.

13. The apparatus of claim 1 including: a pivotally mounted blocking member connected to the first frame member, the blocking member moveable between first and second positions to engage and disengage the lever.

14. An apparatus for maneuvering a motor vehicle in a confined space, the vehicle having one or more wheel assemblies, the apparatus comprising: a generally U-shaped frame assembly adapted to be positioned adjacent opposite sides one of the one or more wheel assemblies, the frame assembly having generally linear first and second frame members, each frame member having an outer end attached to an outwardly directed arm, the second frame member having a rectangular shaped inner end telescopically received by a rectangular shaped inner end in the first frame member, each arm having a pivotally mounted roller assembly, the roller assembly having a pair of rollers rotatably mounted on the roller assembly, a lever connected to the the first frame member, the lever having a lower end pivotally connected to a plate member, the plate member having one or more fingers engaging the second frame member upon operation of the lever to move the second frame member toward the first frame member, the rollers moveable into engagement with and rotatable relative to an outer surface of the wheel assembly when the first and second frame members are contracted to raise the wheel assembly, each roller assembly being mounted on an inwardly and upwardly inclined bracket whereby one of the rollers is located inwardly and downwardly from the arm and the other roller is positioned upwardly and in general vertical alignment with the arm, the second frame member having a plurality of equally spaced holes open to the top surface of the second frame member, the first frame member having an opening aligned with one of the holes in the second frame member, a pin extending through the opening and aligned hole to lock the position of the first and second frame members relative to one another, the pin engaging a flange located between the holes in the second frame member whereby the pin is moved in an upward direction when the second frame member is moved toward the first frame member thereby forcing the pin out of the aligned hole to allow further contraction of the first and second frame members, the pin moveable downwardly into an adjacent hole located immediately inwardly from the aligned hole when the adjacent hole is moved into vertical alignment with the pin to relock the position of the first and second frame members, and a blocking member pivotally connected to the first frame member the blocking member moveable between first and second positions to engage and disengage the lever.

15. The apparatus of claim 14 including: means located between the telescoping surfaces of the first and second frame members to reduce friction between the first and second frame members.

16. The apparatus of claim 15 wherein: the means located between the telescoping surfaces of the first and second frame members to reduce friction between the first and second frame members is one or more spring members.

17. The apparatus of claim 14 wherein: the pin is accommodated by an upwardly projecting sleeve surrounding the opening in the first frame member, the pin having a tab member, the top of the sleeve having a downwardly extending slot open to the top of the sleeve, the tab member accommodated by the slot when the pin is in the lock position.

* * * * *